ELECTRICAL CONVERTERS

Filed May 31, 1962 3 Sheets-Sheet 1

WITNESSES
Leon J. Jaza
Donald R. Lackey

INVENTOR
August P. Colaiaco
BY F. E. Browder
ATTORNEY

April 26, 1966 A. P. COLAIACO 3,248,636

ELECTRICAL CONVERTERS

Filed May 31, 1962 3 Sheets-Sheet 2

United States Patent Office 3,248,636 Patented Apr. 26, 1966

3,248,636
ELECTRICAL CONVERTERS

August P. Colaiaco, Forest Hills, Pa., assignor to Westinghouse Electric Corporation, East Pittsburgh, Pa., a corporation of Pennsylvania Filed May 31, 1962, Ser. No. 198,842
3 Claims. (Cl. 321—8)

The present invention relates in general to electrical converters for converting alternating current to direct current and more particularly to unitary transformer-rectifier apparatus.

Conventionally, transformer-rectifier apparatus comprises two separate units, a transformer and a rectifier. This requires transformer input and output bushings and terminals, rectifier input and output bars and terminals and bus bars to interconnect the two units. Also, cooling means for both the transformer and rectifier are required.

Accordingly, it is the general object of this invention to provide a new and improved transformer-rectifier apparatus.

It is a more particular object of the invention to provide a new and improved unitary transformer-rectifier apparatus in which both the transformer and rectifier are cooled by a common coolant.

Still another object of this invention is to provide a new and improved transformer-rectifier apparatus that requires no interconnecting bus bars and a reduced number of insulating bushings.

Briefly, the present invention accomplishes the above cited objects by mounting the rectifiers on an electrically conductive heat sink or sinks, with the heat sink provided with appropriate cooling channels or paths for flow of a cooling medium. The heat sink is then connected with the transformer in such a way that the transformer cooling medium is conveyed in thermal communication with the heat sink channels. The transformer is then electrically connected to the rectifiers. The housing of the rectifier coolant supply line may be used as an electrical conductor to or from the rectifiers, as the circuitry used may permit.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGS. 7 through 11 show typical rectifier circuits only and the invention is not to be limited to these arrangements.

Figure 1:
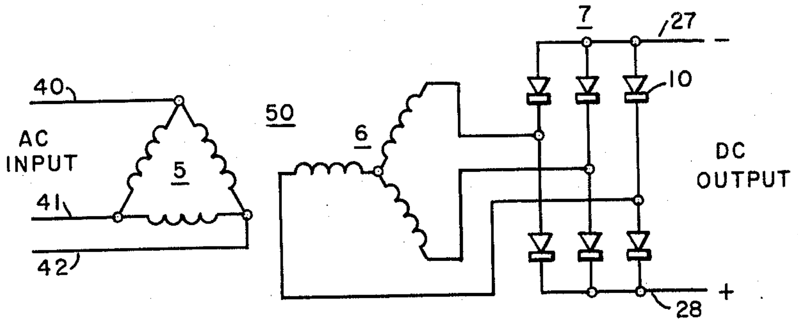
FIG. 1 is a schematic diagram of a transformer-rectifier circuit.

The schematic diagram of FIG. 1 shows a circuit connection of a transformer 50 and a rectifier 7 with the rectifier 7 connected in a conventional three-phase bridge circuit. The primary 5 of the transformer 50 is connected to alternating current supply voltage lines 40, 41 and 42, and the secondary 6 of the transformer 50 is connected to the rectifier circuit 7.

Figure 2:
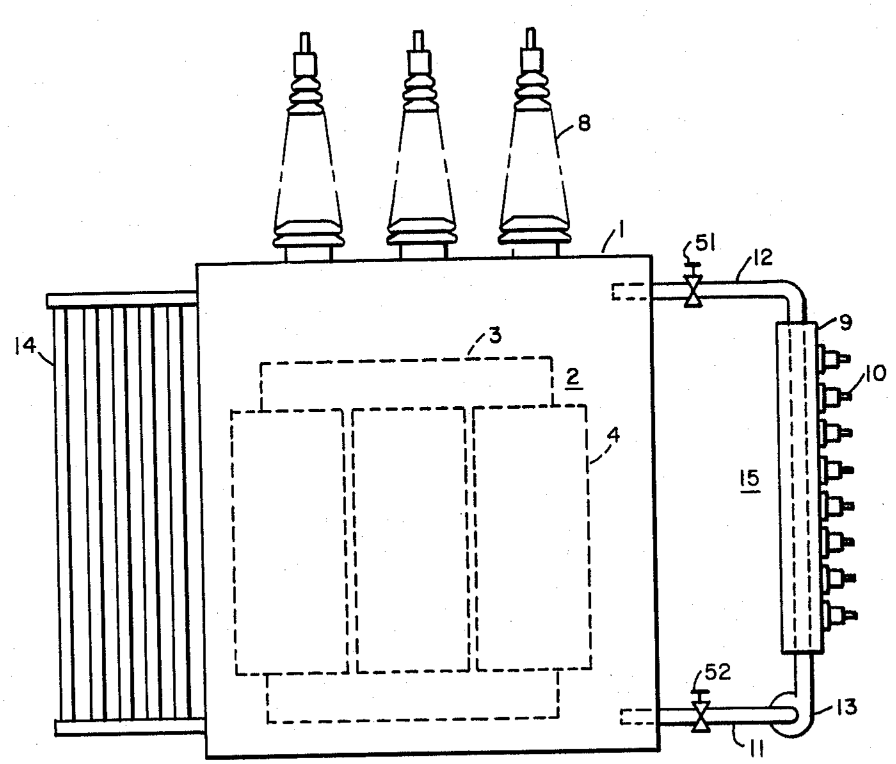
FIG. 2 is a side elevation of a transformer-rectifier assembly.

FIG. 2 shows a unitary transformer-rectifier apparatus, with the transformer tank 1 formed of steel or other suitable material. Within the transformer tank is mounted the transformer 2 comprising a core 3 and primary and secondary windings indicated in general at 4. The primary 5 and secondary 6 shown schematically in FIG. 1 are not specifically shown in FIG. 2, as their relative arrangement upon the core 3 is not a part of this invention. The alternating current input line terminals 8 are shown extending from the top of the tank 1. The tank 1 contains a coolant, which completely surrounds the transformer 2.

A rectifier mounting block or heat sink 9 is shown with a plurality of rectifier cells 10 mounted upon it. Extending from the tank 1 to the mounting block 9 are coolant conducting pipes 11 and 12. Coolant is circulated from the tank 1, through the coolant conductor 11 to the mounting block 9. The coolant, being in contact or thermal communication with mounting block 9, is heated by the losses in the rectifier cells 10 and flows back to tank 1 through coolant conductor 12. The circulation of coolant through the coolant conductors 11 and 12 and mounting block 9 may be by natural means due to the heating of the coolant, known as thermal syphon effect. Or, it may be forced circulation by virtue of a suitably located pump 13. If a pump 13 is used, it is practical to use one common pumping connection, even though a plurality of mounting blocks 9 are used. This may be accomplished by using electrically non-conductive hoses to connect the pump 13 to the individual mounting blocks 9. The coolant, heated by the losses in the transformer 2 and rectifier cells 10, is cooled by circulation through the heat exchanger 14. Shutoff valves 51 and 52 may be suitably located to permit removal of the mounting block assembly 15 without loss of coolant from the tank 1. Coolant conductors 11 and 12 may be very short, with the mounting block assembly 15 mounted in close proximity with the transformer tank 1 and enclosed by a suitable enclosure mounted on the transformer tank 1.

Figure 3:
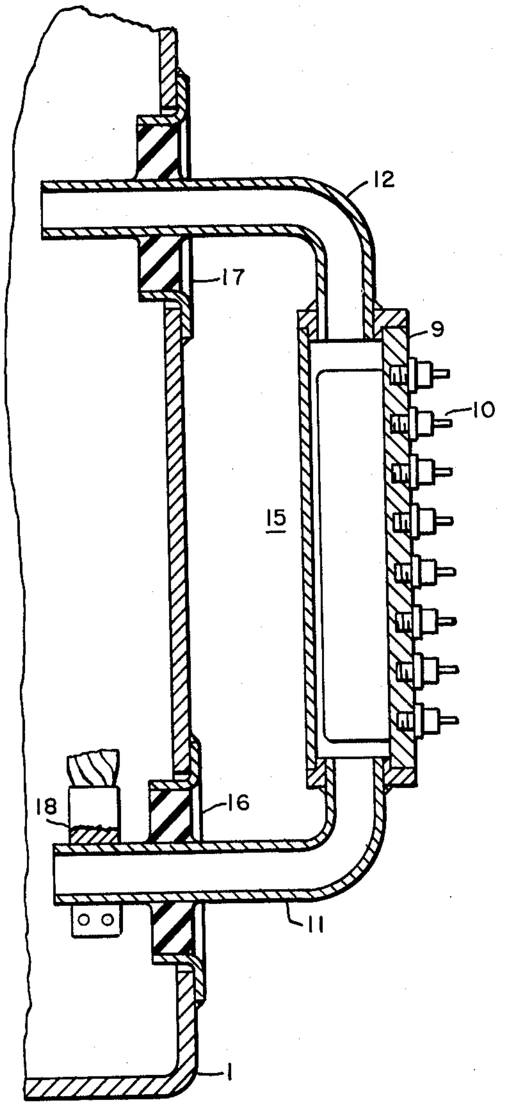
FIG. 3 is a vertical section of a side elevation of a rectifier mounting block attached to a transformer tank.

FIG. 3 shows rectifier assembly 15 and its connection to the transformer tank 1 in greater detail. To permit a number of rectifier assemblies 15 to be connected into various electrical circuit arrangements, the rectifier assembly 15 is isolated from the transformer tank 1. This may be accomplished, as shown in FIG. 3, by an insulating bushing 16 isolating coolant conductor 11 from the tank 1, and insulating bushing 17 isolating coolant conductor 12 from the tank 1. This insulating arrangement permits the coolant conducting pipe 11 or 12 to be used as an alternating current electrical connection 18 to the heat sink 9. The alternating current electrical connection 18 may be connected as shown to coolant conductor 11, or it may be connected to coolant conductor 12.

Figure 4:
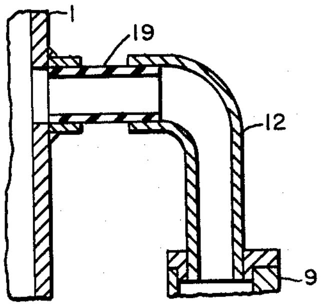
FIG. 4 is a vertical section of a side elevation showing a means for insulating the tank of a transformer from the rectifier coolant conductor.

FIG. 4 shows another method of isolating the heat sink 9 from the transformer tank 1. With this method, an insulating pipe 19 is connected between the tank 1 and the coolant conductor 12. This insulating method could be adopted when the rectifier circuitry used does not call for an alternating current connection to the heat sink 9. When the rectifier circuitry used calls for one of the direct current output terminals to be connected to the heat sink 9, the insulating method shown in FIG. 4 may be used, with the direct current output terminal being connected to the collant conductor 12.

Figure 5:
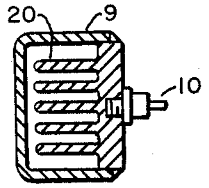
FIG. 5 is a plan view of a rectifier mounting block.

FIG. 5 shows a heat sink 9 having a rectifier cell 10 mounted upon it. Using this configuration, the rectifier cell 10 is cooled by the coolant passing over a plurality of fins 20.

Figure 6:
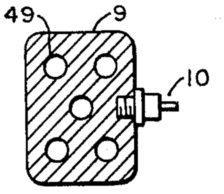
FIG. 6 is a plan view of another rectifier mounting block configuration.

FIG. 6 shows another configuration of the heat sink 9 with a rectifier cell 10 mounted upon it. With this arrangement, the rectifier cell is cooled by the coolant passing through a plurality of channels 49 formed in a solid block of copper, or other suitable material.

Figure 7:
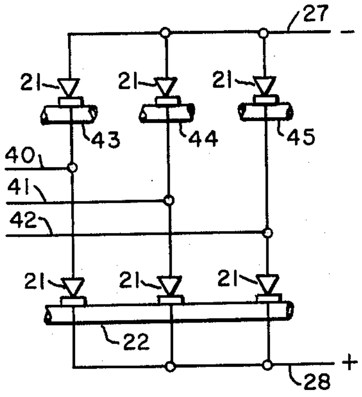
FIG. 7 is a schematic diagram of a rectifier circuit showing the mounting blocks and rectifier coolant conductors.

FIG. 7 shows a three-phase bridge rectifier circuit using all forward poled cells 21. Forward poled cells, as the term is used in this description, refers to those cells that have their cathode electrically connected to the cell mounting stud. Reverse poled cells are those that have their anode electrically connected to the cell mounting stud. The forward poled cells 21, which are shown with their anodes connected to negative direct current bus 27, have their cathodes and, therefore, mounting studs, connected to the three alternating current input lines 40, 41 and 42. The remaining forward pole cells 21 have their cathodes and, therefore, mounting studs connected to positive direct current bus 28. Since the mounting studs of the forward poled cells 21 are connected to four different electrical potentials 40, 41, 42 and 48, a minimum of four mounting blocks or heat sinks is required and a minimum of four rectifier coolant conductor circuits is required. The mounting blocks and coolant conductors are shown as one symbol in the figures, and the four required for FIG. 7 are shown at 43, 44, 45 and 22. The three alternating current connections 40, 41 and 42, to the rectifier circuit may be made directly to the coolant conductors 43, 44 and 45. Alternating current line 40 may be connected to coolant conductor 43, alternating current line 41 may be connected to coolant conductor 44, and alternating current line 42 may be connected to coolant conductor 45. The positive direct current bus 28 may be connected to coolant conductor 22. With this arrangement the coolant conductor pipes 43, 44 and 45 are insulated from the transformer tank 1, as shown in FIG. 3, by insulating bushings 16 and 17. The coolant conductor 22 may be insulated from the transformer tank 1 in the manner shown in FIG. 4, since no alternating current connection is made to coolant conductor 22.

Figure 8:
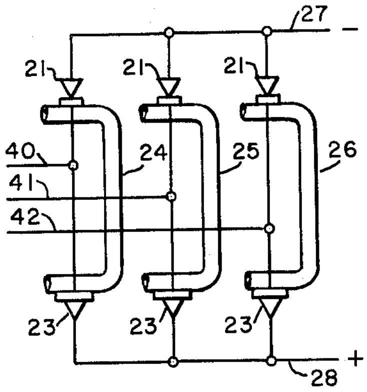
FIG. 8 is a schematic diagram of a rectifier circuit which is a modification of the circuit shown in FIG. 7.

FIG. 8 shows the same basic electrical circuit as FIG. 7. In FIG. 8, however, both forward poled rectifier cells 21 and reverse poled rectifier cells 23 are used. The forward poled rectifier cells 21 have their cathodes and, therefore, their mounting studs connected to the alternating current input lines 40, 41 and 42. The reverse poled rectifier cells 23 have their anodes and, therefore, their mounting studs connected to alternating current input lines 40, 41 and 42. The forward and reverse poled rectifier cells connected to alternating current input line 40 may be mounted on a common heat sink and coolant conductor assembly 24. The alternating current input line 40 may be electrically connected to the coolant conductor 24. Similarly, the alternating current line 41 may be connected to coolant conductor 25 and the alternating current line 42 may be connected to coolant conductor 26. Only three cooling conductor assemblies 24, 25 and 26 are required with this arrangement, and all three alternating current input lines 40, 41 and 42 are connected to coolant conductors 24, 25 and 26, respectively.

Figure 9:
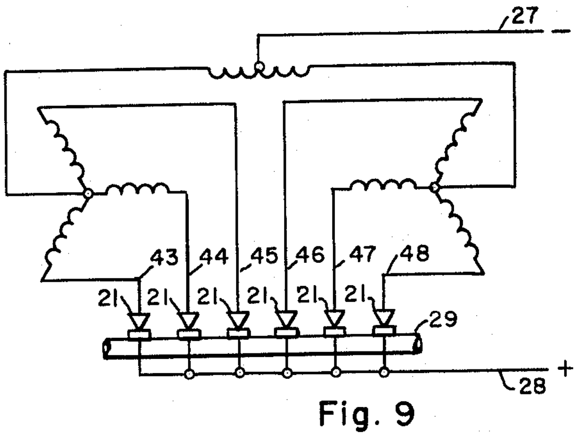
FIG. 9 is a schematic diagram of another rectifier circuit showing the mounting block and rectifier coolant conductor.

FIG. 9 illustrates a three-phase double Y electrical circuit using all forward poled rectifier cells 21. Since the cathodes and, therefore, the mounting studs of all the rectifier cells 21 are all connected to the positive direct current bus 28, only one mounting block and cooling assembly 29 is required. The positive direct current bus 28 may be connected to coolant conductor 29. However, the alternating current electrical lines 43, 44, 45, 46, 47 and 48 must be brought through the side of the transformer tank by conventional transformer bushings.

Figure 10:
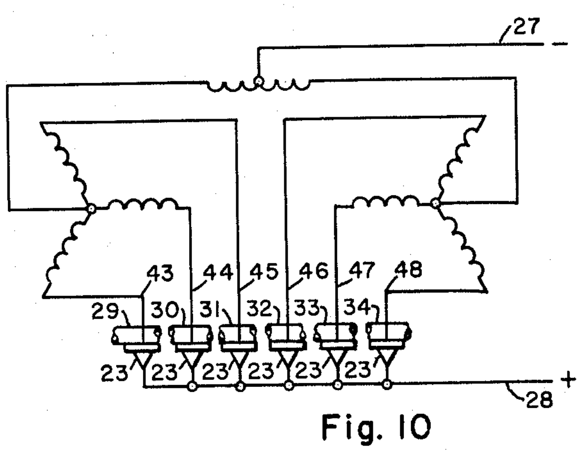
FIG. 10 is a schematic diagram of a rectifier circuit which is a modification of the circuit shown in FIG. 9.

FIG. 10 shows the same basic electrical circuit as FIG. 9, except that all reverse poled rectifier cells 23 are used. Using reverse poled rectifier cells 23, their anodes and, therefore, their mounting studs are connected to the alternating current supply lines 43, 44, 45, 46, 47 and 48. Since their mounting studs are connected to six different alternating current electrical potentials, a minimum of six heat sinks and coolant conducting assemblies 29, 30, 31, 32, 33 and 34 are required. The six alternating current electrical lines 43, 44, 45, 46, 47 and 48 may be electrically connected to coolant conductors 29, 30, 31, 32, 33 and 34, with alternating current line 43 connected to coolant conductor 29, line 44 connected to coolant conductor 30, line 45 connected to coolant conductor 31, line 46 connected to coolant conductor 32, line 47 connected to coolant conductor 33, and line 48 connected to coolant conductor 34. With this arrangement, the only type of insulating bushings required are those shown in FIG. 3 as 16 and 17.

Figure 11:
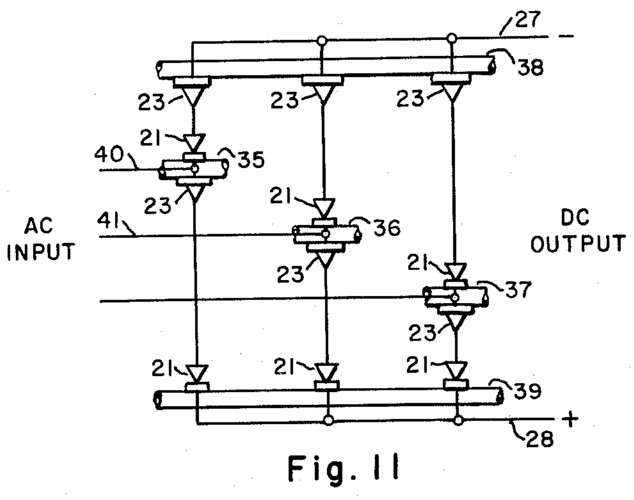
FIG. 11 is a schematic diagram of still another rectifier circuit showing the mounting blocks and rectifier coolant conductors.

FIG. 11 shows a three-phase bridge rectifier circuit using forward poled rectifier cells 21 and reverse poled recifier cells 23 in series in each leg of the bridge circuit. The reverse poled rectifier cells 23 that have their anodes and, therefore, their mounting studs connected to the negative direct current bus 27 may be mounted on a common heat sink and cooling conductor 38. The negative direct current bus 27 may be connected to cooling conductor 38. The forward poled rectifier cells that have their cathodes and, therefore, mounting studs connected to positive direct current bus 28, may be mounted on a common heat sink and cooling conductor 39. The positive direct current bus 28 may be connected to cooling conductor 39.

The forward and reverse poled rectifier cells 21 and 23 connected to alternating current line 40, may have their studs mounted on a common heat sink and coolant conductor 35. Alternating current line 40 may be connected to cooling conductor 35.

Similarly, the forward and reverse poled rectifier cells connected to alternating current line 41 may have their studs mounted to a common heat sink and coolant conductor 36. The alternating current line 41 may be connected to coolant conductor 36. Similarly, the forward and reverse poled rectifier cells connected to alternating current line 42 may have their studs mounted to a common heat sink and coolant conductor 37. Alternating current line 42 may be connected to coolant conductor 37.

It is, therefore, apparent that there has been disclosed a new and improved unitary transformer-rectifier apparatus. The transformer and rectifier are cooled by a common coolant and interconnecting bus bars have been eliminated, with the coolant conductors serving as interconnecting bus bars. Also, a reduced number of insulating bushings are required.

While there have been shown and described what are at present considered to be the preferred embodiments of the invention, modifications thereto will readily occur to those skilled in the art. It is not desired, therefore, that the invention be limited to the specific arrangements shown and described, and it is intended to cover in the appended claims all such modifications as fall within the true spirit and scope of the invention.

I claim as my invention:

1. A transformer-rectifier combination comprising, a transformer having a plurality of coils including six secondary coils, a tank having a coolant therein, said coils being mounted in said tank and surrounded by said coolant, terminal connections extending through and insulated from said tank for connection of an alternating current supply voltage to said coils, a plurality of electrically conductive heat sinks having a plurality of reverse poled rectifier cells mounted thereon, electrically conductive coolant conducting means extending through said tank to said heat sinks and back to said tank, said coolant conducting means being insulated electrically from said tank, said coolant being conveyed through said coolant conducting means in thermal communication with said heat sinks, means electrically insulating said heat sinks from said tank, said transformer secondary coils being electrically connected to said rectifier cells through said coolant conducting means, said coolant conducting means providing the complete electrical connection between said transformer secondary coils and said rectifier cells.

2. A transformer rectifier combination comprising a transformer having a plurality of primary and secondary coils, a tank having a coolant therein, said coils being mounted in said tank and surrounded by said coolant, terminal connections extending through and insulated from said tank for connection of an alternating current supply voltage to said primary coils, electrically conductive heat sinks having a plurality of forward and reverse poled rectifier cells mounted thereon, coolant conducting means extending through said tank to said heat sinks and back to said tank, said coolant conducting means being insulated electrically from said tank, said coolant being conveyed through said coolant conducting means in thermal communication with said heat sinks, means electrically insulating said heat sinks from said tank, said transformer secondary coils being electrically connected to said rectifier cells through said coolant conducting means, said coolant conducting means providing the complete electrical connection between said transformer secondary coils and said rectifier cells.

3. A transformer-rectifier combination comprising, a transformer having a plurality of electrical coils disposed in a tank containing a coolant, electrically conductive heat sink means, rectifier means mounted on said heat sink means, electrically conductive coolant conducting means disposed to enter said tank and being electrically insulated therefrom, said coolant conducting means being connected to said heat sink means to direct coolant from said transformer in a circuit which includes said heat sink means, certain of the electrical coils of said transformer being electrically connected to said coolant conducting means within the tank, said coolant conducting means providing the complete electrical connection between said transformer and said rectifier means.

References Cited by the Examiner

UNITED STATES PATENTS

| | | | |
|---|---|---|---|
| 2,162,740 | 6/1939 | Mirrick | 317—234 |
| 2,917,685 | 12/1959 | Wiegand | 317—234 |
| 2,942,165 | 6/1960 | Jackson et al. | 317—234 |
| 3,068,391 | 12/1962 | Kliesch | 321—8 |
| 3,173,061 | 3/1965 | Storsand | 317—100 |

MILTON O. HIRSHFIELD, *Primary Examiner.*

LLOYD McCOLLUM, *Examiner.*

GEORGE BUDOCK, JEROME C. SQUILLARO, *Assistant Examiners.*